US010182155B2

(12) United States Patent
Meredith et al.

(10) Patent No.: US 10,182,155 B2
(45) Date of Patent: Jan. 15, 2019

(54) DIRECTING CARE CALLS USING HISTORICAL CALL BACKS, DEMOGRAPHICS AND REAL TIME ATTRIBUTES

(71) Applicants: AT&T INTELLECTUAL PROPERTY I, L.P., Atlanta, GA (US); AT&T Mobility II LLC, Atlanta, GA (US)

(72) Inventors: Sheldon K. Meredith, Roswell, GA (US); William Cottrill, Canton, GA (US); Brandon B. Hilliard, Woodstock, GA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 255 days.

(21) Appl. No.: 15/014,820

(22) Filed: Feb. 3, 2016

(65) Prior Publication Data
US 2017/0223189 A1  Aug. 3, 2017

(51) Int. Cl.
*H04M 3/51*  (2006.01)
*G10L 25/03*  (2013.01)
(Continued)

(52) U.S. Cl.
CPC .......... *H04M 3/5233* (2013.01); *G10L 25/03* (2013.01); *G10L 25/51* (2013.01); *H04M 3/5166* (2013.01);
(Continued)

(58) Field of Classification Search
CPC ... H04M 3/5233; H04M 3/5166; G10L 15/02; G10L 25/03
(Continued)

(56) References Cited

U.S. PATENT DOCUMENTS 6,411,687 B1* 6/2002 Bohacek .................. H04M 3/51
379/201.11
6,798,876 B1  9/2004 Bala
(Continued)

FOREIGN PATENT DOCUMENTS

WO    2010027671    3/2010

*Primary Examiner* — Quynh H Nguyen
(74) *Attorney, Agent, or Firm* — Akerman LLP; Michael K. Dixon; Mammen (Roy) P. Zachariah, Jr.

(57) ABSTRACT

A system for directing calls using historical call backs, demographics, and real time attributes is disclosed. In particular, the system may receive incoming calls at an interactive voice response system. Based on speech occurring during the calls, the system may determine attributes of the callers. The system may then utilize the determined attributes, call records, demographic information pertaining to account owners, real time call attribute assessment systems, regression analyses, and various types of information to direct the calls from the interactive voice response system to an optimal agent for handling. Notably, the system may direct the calls to those agents that have a higher probability of successful interaction with the calling parties so as to reduce follow-up calls, which may be costly to the entity receiving the calls. A subset of the calls may be directed to agents at random so as to facilitate the collection of unbiased information.

20 Claims, 4 Drawing Sheets

(51) Int. Cl.
*G10L 25/51* (2013.01)
*H04M 3/523* (2006.01)

(52) U.S. Cl.
CPC .. *H04M 2201/40* (2013.01); *H04M 2203/551* (2013.01)

(58) Field of Classification Search
USPC .............................. 379/265.12, 266.01, 309
See application file for complete search history.

(56) References Cited

U.S. PATENT DOCUMENTS

| | | |
|---|---|---|
| 7,269,249 B2 | 9/2007 | Woodring |
| 7,657,005 B2 * | 2/2010 | Chang ................. H04M 3/5183 370/352 |
| 8,295,471 B2 | 10/2012 | Spottiswoode et al. |
| 8,359,219 B2 | 1/2013 | Chishti et al. |
| 8,433,597 B2 | 4/2013 | Chishti et al. |
| 8,634,542 B2 | 1/2014 | Spottiswoode et al. |
| 8,644,490 B2 | 2/2014 | Stewart |
| 8,699,694 B2 | 4/2014 | Chishti et al. |
| 8,781,106 B2 | 7/2014 | Afzal |
| 8,792,631 B2 | 7/2014 | Addair |
| 2007/0160054 A1 * | 7/2007 | Shaffer ............... H04M 3/5175 370/395.2 |
| 2009/0190745 A1 | 7/2009 | Xie et al. |
| 2010/0020959 A1 | 1/2010 | Spottiswoode |
| 2010/0111287 A1 | 5/2010 | Xie et al. |
| 2014/0086402 A1 | 3/2014 | Kan et al. |
| 2015/0264178 A1 | 9/2015 | Chishti |

* cited by examiner

DIRECTING CARE CALLS USING HISTORICAL CALL BACKS, DEMOGRAPHICS AND REAL TIME ATTRIBUTES

FIELD OF THE INVENTION

The present application relates to call routing technologies, network communication technologies, interactive voice response technologies, call attribute assessment technologies, and mobile device technologies, and more particularly, to a system, apparatus, and method for directing calls using historical call backs, demographics, and real time attributes.

BACKGROUND

In today's technology-driven society, users regularly utilize various types of devices to communicate with each other and to communicate with various computer systems. For example, users utilize smartphones, tablets, phablets, computers, mobile devices, and other technologies to make telephone calls, access customer service and support systems, access various types of internet services, access content and information, access speech recognition systems, perform a variety of tasks and functions, or a combination thereof. In order to provide assistance to such users, businesses often employ the use of customer support services involving the use of customer service agents and interactive voice response (IVR) systems. Such customer service agents and IVR systems often assist users with troubleshooting issues relating to services and products provided by the businesses, upgrading existing services and products, answering questions relating to products and services, providing training relating to services and products, cancelling existing services subscribed to by users, providing instructions relating to the installation of various services and products, and providing a variety of other types of assistance to users.

While current versions of customer support services provide many benefits, current customer support services are typically a major source of costs for businesses. For example, at many businesses, there is a fairly linear relationship between the numbers of incoming calls and the number of employed customer service agents required to service those calls. If a customer service agent services an average of forty calls per day at a minimum cost of ten dollars and the business employs 30,000 plus customer service agents, then the total financial burden for providing customer service support may be on the order of billions per year for the business. Additionally, current customer support services are often plagued by issues such as, but not limited to, long user wait times, repeat call backs made by users to address the same issue, inability to fully understand user problems, and suboptimal customer service agent effectiveness and efficiency. As a result, current customer service systems may be enhanced so as to provide improved efficiencies, provide improved functionality and features, provide improved ease-of-use, and provide substantial cost savings to businesses.

SUMMARY

A system, an apparatus, and accompanying methods for directing calls using historical call backs, demographics, and real time attributes are disclosed. In particular, the system, apparatus, and methods may improve the operation of a customer care center by directing an incoming call from a user to a customer service agent that has a higher probability of a successful interaction with the user, such as through the use of statistical regression methods. By doing so, the system, apparatus, and methods may assist in reducing return calls (i.e. call backs) to the customer care center to address the same issue brought up by the user in the initial incoming call. In order to accomplish the foregoing, the system, apparatus, and methods may include receiving, at a customer care center, a call from a user. Initially, the call may be connected to an IVR system and real time attributes and information about the user may be collected based on analyzing speech made by the user during the call with the IVR system. Such attributes and information may include, but is not limited to, words being used by the user during the call, voice frequency analysis information of the user (e.g. used to determine gender, age, race, etc.), volume inflection information, user response speed information, any other information, or any combination thereof.

Once the attributes and information are collected and determined, the system, apparatus, and method may determine if the attributes and information match those of an account owner. For example, if the user is calling seeking assistance with services associated with a certain mobile telephone account, the system, apparatus, and methods may compare the attributes and information collected during the call to previously stored information in a user profile of the account owner of the mobile telephone account. If the comparison of the attributes and information collected during the call with the user profile indicates that the user is the account owner, the system, apparatus, and methods may include accessing historical demographic information for the account owner. When a customer service agent is selected to participate in the call with the user, all of the attributes and information collected, along with the historical demographic information, may be included in a call record, which may be matched with the selected customer service agent. The customer service agent may be connected to the call with the user, and the system, apparatus, and methods may continue to collect additional attributes and information from additional speech made by the user after connected with the customer service agent. Such attributes and information may indicate whether the user is likely a male or female, whether the user is under stress, has an accent, or even has a certain education level. The additional attributes and information may also be included in the call record. As additional users call, their attributes and information may be obtained during their calls, and additional corresponding call records may be created.

Over time, the system, apparatus, and methods may be utilized to monitor which of these users are calling back into the customer care center and why, such as through the use of cause codes. The system, apparatus, and methods may include performing regression analyses to determine which attributes (e.g. demographic attributes) of these users work best with a particular customer service agent. For example, for a particular set of demographic attributes, the average number of call backs to the customer care center may be 0.141. However, a particular customer service agent may demonstrate that they handle customers having the particular set of demographic attributes with an average number of call-backs of 0.114. Based on such information, real-time attributes and information obtained from speech, and historical demographic information, the system, apparatus, and methods, may dynamically select the optimal customer service agents to speak with users when the users call into the IVR system. In certain embodiments, this may imply a slight time delay in the customer agent selection process to ensure enough agents are available to have a meaningful selection. For example, if an agent is to be assigned, and the very next agent to free up is immediately assigned, then the total number of agent candidates is exactly one. If, however, the system, apparatus, and methods include waiting a for a time interval, there may be many more agent candidates to choose from. The optimal agent may then be selected from the agent candidates.

Since the system, apparatus, and methods involve directing agents to users, this may imply a lack of randomness. In order to continue to collect unbiased information for conducting the regression analyses, the system, apparatus, and methods may include ensure that a certain percentage of calls are assigned to agents randomly. The system, apparatus, and methods may keep track of which calls are assigned to an agent randomly versus which calls are specifically directed to specific agents. A database for regression analysis of the effectiveness of agents versus demographics of callers may be built up over time. After the database is built up, call direction may be performed, and, thereafter, a certain percentage of calls to an agent may need to be truly random for ongoing regression updates. Based on the functionality provided according to the present disclosure, the system, apparatus, and methods may provide for improved call handling times, reduced call backs, greater cost savings, and other benefits.

In one embodiment, a system for directing calls using historical call backs, demographics, and real time attributes is disclosed. The system may include a memory that stores instructions and a processor that executes the instructions to perform various operations of the system. The system may perform an operation that includes receiving, at an IVR system, a first call from a first user seeking assistance. Based on first speech of the first user that occurs during the first call, the system may perform an operation that includes determining a first set of attributes associated with the first user. The system may then perform an operation that includes comparing the first set of attributes associated with the first user to a user profile of an owner of an account associated with the first call to determine if the first user is the owner of the account. If the first user is determined to be the owner of the account, the system may perform an operation that includes selecting, such as by utilizing regression analyses using the first set of attributes and historical demographic information of the owner of the account, a first agent having a first score that indicates a higher probability of a successful interaction with the first user than other available agents. When the first agent is selected, the system may perform an operation that includes generating a call record including the first set of attributes associated with the first user and historical demographic information of the owner of the account and matching the call record to the first agent. The system may then perform an operation that includes connecting the first agent to the first call with the first user so as to provide assistance to the first user.

In another embodiment, a method for directing calls using historical call backs, demographics, and real time attributes is disclosed. The method may include utilizing a memory that stores instructions, and a processor that executes the instructions to perform the various functions of the method. The method may include receiving, at an IVR system, a first call from a first user seeking assistance. Based on first speech of the first user that occurs during the first call, the method may include determining a first set of attributes associated with the first user. The method may then include comparing the first set of attributes associated with the first user to a user profile of an owner of an account associated with the first call to determine if the first user is the owner of the account. Additionally, the method may include selecting, based on the first set of attributes and historical demographic information of the owner of the account, a first agent having a first score that indicates a higher probability of a successful interaction with the first user than other available agents. When the first agent is selected and if the first user is determined to be the owner of the account, a call record including the first set of attributes associated with the first user and historical demographic information of the owner of the account may be created and matched to the first agent. Moreover, the method may include connecting the first agent to the first call with the first user.

According to yet another embodiment, a computer-readable device having instructions for directing calls using historical call backs, demographics, and real time attributes is provided. The computer instructions, which when loaded and executed by a processor, may cause the processor to perform operations including: receiving, at an interactive voice response system, a first call from a first user seeking assistance; determining, based on first speech of the first user that occurs during the first call, a first set of attributes associated with the first user; determining, based on comparing the first set of attributes associated with the first user to a user profile of an owner of an account associated with the first call, if the first user is the owner of the account; selecting, if the first user is the owner of the account and based on the first set of attributes and historical demographic information of the owner of the account, a first agent having a first score that indicates a higher probability of a successful interaction with the first user than other available agents; generating a call record including the first set of attributes associated with the first user and historical demographic information of the owner of the account and associating the call record with the first agent; and connecting the first agent to the first call with the first user.

These and other features of the systems, apparatuses, and methods for directing calls using historical call backs, demographics, and real time attributes are described in the following detailed description, drawings, and appended claims.

DETAILED DESCRIPTION OF THE INVENTION

Figure 1:
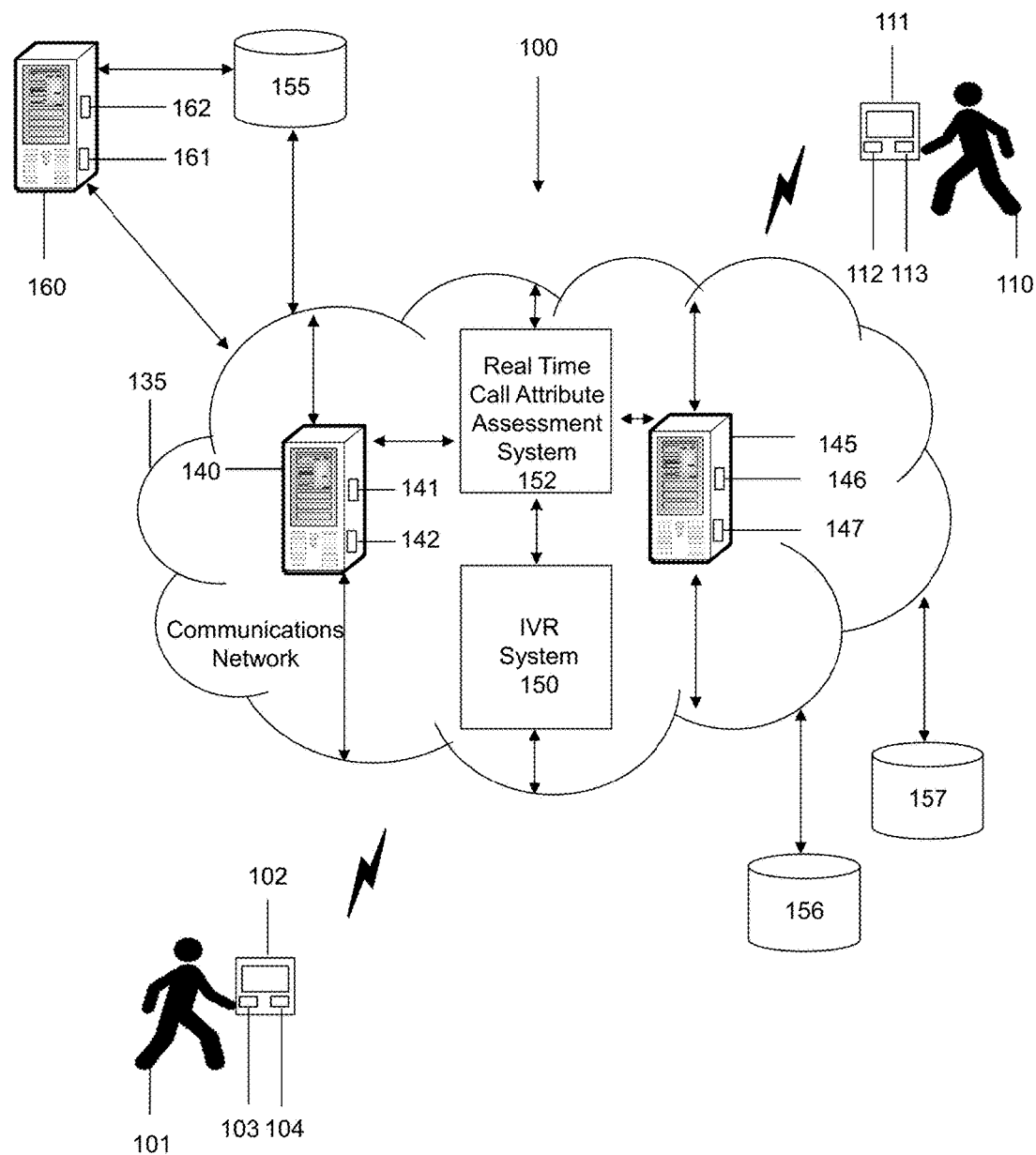
FIG. 1 is a schematic diagram of a system and apparatus for directing calls using historical call backs, demographics, and real time attributes according to an embodiment of the present disclosure.

A system 100, an apparatus 200, and accompanying methods for directing calls using historical call backs, demographics, and real time attributes are disclosed. In particular, the system 100, apparatus 200, and methods may improve the operation of a customer care center 107 by directing an incoming call from a user (e.g. first user 101) to a customer service agent (e.g. second user 110) that has a higher probability of a successful interaction with the user, such as through the use of statistical regression methods. By doing so, the system 100, apparatus 200, and methods may assist in reducing return calls (i.e. call backs) to the customer care center 107 to address the issue brought up by the user in the initial incoming call. In order to accomplish the foregoing, the system 100, apparatus 200, and methods may include receiving, at a customer care center 107, a call from a user. Initially, the call may be connected to an IVR system 150 and real time attributes and information about the user may be collected based on analyzing speech made by the user during the call with the IVR system 150. Such attributes and information may include, but are not limited to, words being used by the user during the call, voice frequency analysis information of the user (utilized to determine gender, age, race, etc.), volume inflection information, user response speed information, voice tone information, voice pitch information, any other information, or any combination thereof.

Once the attributes and information are collected and determined, the system 100, apparatus 200, and methods may determine if the attributes and information match those of an account owner. For example, if the user is calling seeking assistance with services associated with a certain internet protocol television account, the system 100, apparatus 200, and methods may compare the attributes and information collected during the call to information contained in a user profile of the account owner of the internet protocol television account. If the comparison of the attributes and information collected during the call with the user profile indicates that the user is the account owner, the system 100, apparatus 200, and methods may include accessing historical demographic information for the account owner. All of the attributes and information collected, along with the historical demographic information, may be included in a call record, which may be matched to a customer service agent selected from pool of agents 108 to interact with the user. The customer service agent may be connected to the call with the user, and the system 100, apparatus 200, and methods may continue to collect additional attributes and information from additional speech made by the user after connected with the customer service agent. Such attributes and information may indicate whether the user is likely a male or female, whether the user is under stress, has an accent, has a certain education level, has a certain irritability level, has a certain anger level, and/or any other information associated with the user. The additional attributes and information may also be included in the call record. As additional users call, their attributes and information may be obtained during their calls, and additional corresponding call records may be created.

Over time, the system 100, apparatus 200, and methods may be utilized to monitor which of these users are calling back into the customer care center 107 and why, such as through the use of cause codes. The system 100, apparatus 200, and methods may then include performing regression analyses to determine which attributes (e.g. demographic attributes) of these users work best with a particular customer service agent. For example, for a particular set of demographic attributes, the average number of call backs to the customer care center 107 may be 0.257. However, a particular customer service agent may demonstrate that they handle customers having the particular set of demographic attributes with an average number of call-backs of 0.129. Based on such information, real-time attributes and information obtained from speech, and historical demographic information, the system 100, apparatus 200, and methods, may dynamically select the optimal customer service agents to speak with users when the users call into the IVR system 150. In certain embodiments, this may imply a slight time delay in the customer agent selection process to ensure enough agents are available to have a meaningful selection. For example, if an agent is to be assigned, and the very next agent to free up is immediately assigned, then the total number of agent candidates is exactly one. If, however, the system 100, apparatus 200, and methods include waiting a for a time interval, there may be many more agent candidates to choose from. The optimal agent may then be selected from the pool of agents 108.

Since the system 100, apparatus 200, and methods involve directing agents to users, this may imply a lack of randomness. In order to continue to collect unbiased information for conducting the regression analyses, the system 100, apparatus 200, and methods may include ensure that a certain percentage of calls are assigned to agents randomly. The system 100, apparatus 200, and methods track which calls are assigned to an agent randomly versus which calls are specifically directed to specific agents. A database (e.g. database 156) for regression analysis of the effectiveness of agents versus demographics of callers may be built up over time. After the database is built up, call direction may be performed, and, thereafter, a certain percentage of calls to an agent may need to be truly random for ongoing regression updates. Based on the functionality provided according to the present disclosure, the system 100, apparatus 200, and methods may provide for improved call handling times, reduced call backs, greater cost savings, other benefits, or a combination thereof.

Figure 2:
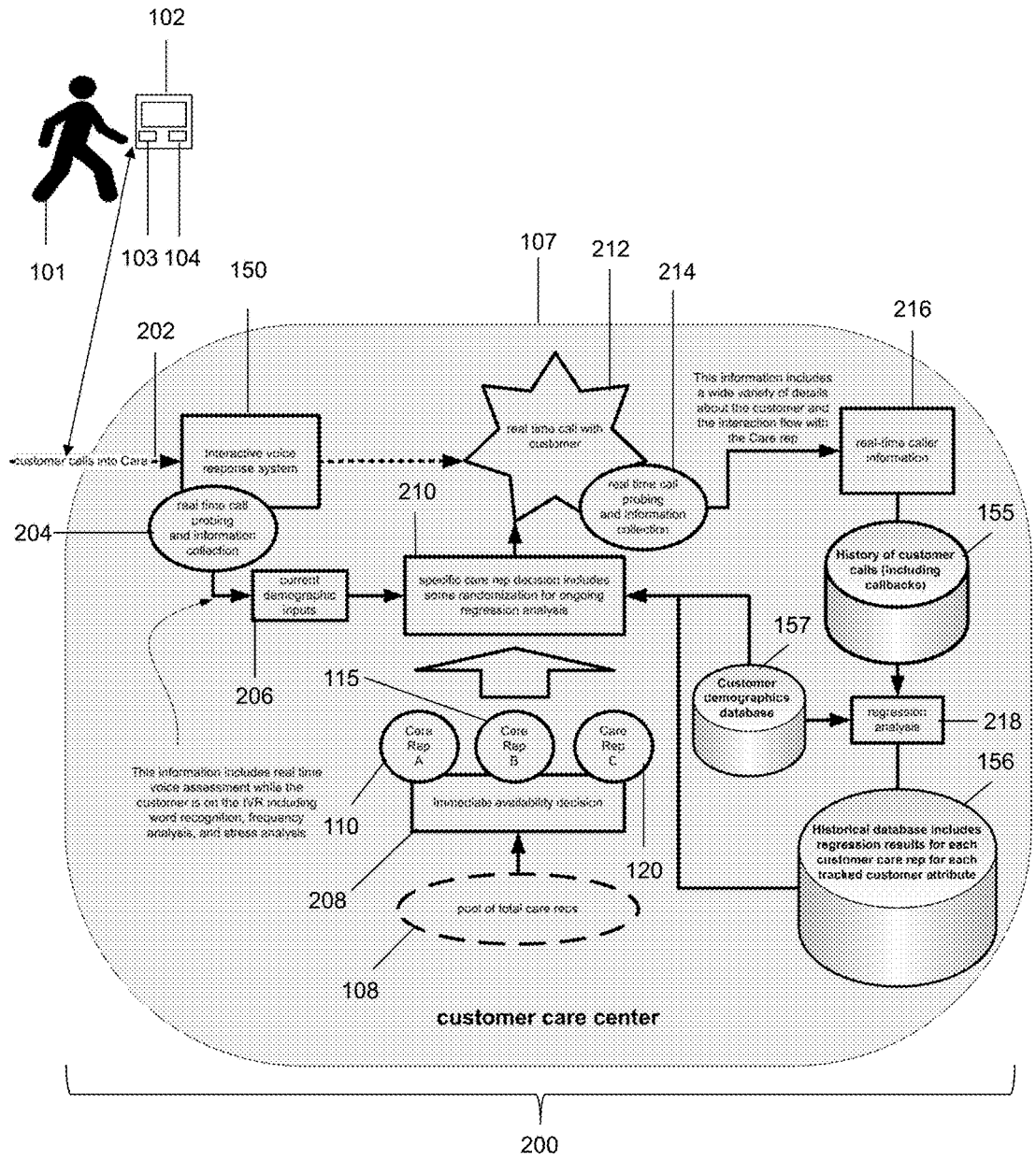
FIG. 2 is a schematic diagram illustrating additional components and functionality of the system and apparatus of FIG. 1.

As shown in FIGS. 1-2, a system 100 and apparatus 200 for directing calls using historical call backs, demographics, and real time attributes is disclosed. The system 100 may be configured to support, but is not limited to supporting, telephone services, IVR services, customer support services, IPTV services, digital video recorder services, cloud computing services, content delivery services, IP Multimedia Subsystem (IMS) services, satellite services, fiber services, voice-over-internet protocol services (VoIP), voice-over-long-term-evolution (VoLTE) services, LTE services, software as a service (SaaS) applications, gaming applications and services, social media applications and services, operations management applications and services, productivity applications and services, mobile applications and services, and any other computing applications and services. The system may include a first user 101 that may utilize a first user device 102 to make telephone calls, access data, access content, access services, and/or to perform a variety of other functions. As an example, the first user 101 may utilize first user device 102 to establish a telephone call and connect with an IVR system 150, input responses to prompts made by the IVR system 150, connect the call with the second user 110 using the second user device 111, perform any other operations, or any combination thereof.

In certain embodiments, the first user 101 may be a subscriber of a service provider, and the first user device 102 may be equipped for mobile communication. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIGS. 1-2. In certain embodiments, the first user device 102 may communicate with any of the devices in the system 100, or any combination thereof, by utilizing infrared radiation, radio frequency technologies, Bluetooth connectivity, ZigBee, Z-Wave, any type of wireless protocol, radio technologies, or any combination thereof.

The system may also include a second user 110 that may utilize a second user device 111 to also make telephone calls, access data, content, and services, and to perform a variety of other functions. In certain embodiments, the second user 110 may be a subscriber of a service provider and the second user device 111 may be equipped for mobile communication. For example, the second user device 111 may be utilized by the second user 110 to communicate with the first user 101 via a call connected to the first user device 102. In certain embodiments, the second user 110 may be a customer service agent of a business that the first user 101 is able to communicate with regarding one or more products, services, or a combination thereof, and/or regarding any assistance needed. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a phone device in FIG. 1. In certain embodiments, the second user device 111 may communicate with any of the devices in the system 100, or any combination thereof, by utilizing infrared radiation, radio frequency technologies, Bluetooth connectivity, ZigBee, Z-Wave, any type of wireless protocol, radio technologies, or any combination thereof.

In certain embodiments, the first and second user devices 102, 111 may have any number of software applications and/or application services stored and/or accessible thereon. For example, the first and second user devices 102, 111 may include customer service applications, business applications, cloud-based applications, VoIP applications, other types of phone-based applications, product-ordering applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first and second user devices 102, 111 may include associated telephone numbers, device identities, or any other identifiers to uniquely identify the first and second user devices 102, 111.

In certain embodiments, the first and second user devices 102, 111 may have corresponding device profiles. In certain embodiments, each of the devices and systems in the system 100 may have its own corresponding device profile. For example, the IVR system 150, the real time call attribute assessment system 152, and the databases 155, 156, 157 may have their own device/system profiles. Information included in a device/system profile may include, but is not limited to, information specifically corresponding to the first and second user devices 102, 111, information identifying the types of devices that the first and second user devices 102, 111 are, information relating to how the first user 101 utilizes the first user device 102, information relating to how the second user 110 utilizes the second user device 111, information identifying what type of services and information the first user 101 and second user 110 are authorized to access, information indicating each type of component included in the first and second user devices 102, 111, information identifying the processing power, storage capacity, download capabilities, and upload capabilities associated with the first and second user devices 102, 111, any other information associated with the first and second user devices 102, 111, or any combination thereof. The device profiles may be made accessible to any device, network, or a combination thereof, in the system 100.

In addition to device profiles, the system 100 may also include user profiles. A user profile may be a profile corresponding to the first user 101, the second user 110, or any other user. For example, the first user's 101 profile may include information, such as, but not limited to, a name of the first user 101, a gender of the first user 101, the age of the first user 101, an ethnicity of the first user 101, a race of the first user 101, an occupation of the first user 101, languages spoken by the first user 101, any demographic information associated with the first user 101, information identifying the first user device 102, information identifying the types of services subscribed to by the first user 101, information identifying a location of the first user 101, information identifying the types of applications that the first user 101 utilizes, any other information, or any combination thereof. The user profiles may also include an image of the first user 101, voice frequency analysis information corresponding to the voice of the first user 101, recorded speech of the first user 101, volume inflection data and information corresponding to the first user 101, average response speed information corresponding to the first user 101, any other content or information, or any combination thereof. Average response speed information may indicate the average amount of time it takes the first user 101 to respond to a customer agent (e.g. second user 110) that is speaking with the first user 101 and/or to the IVR system 150. The user profiles may also indicate other users that are authorized by the first user 101 to use the services and products subscribed to by the first user 101, other users that are authorized to make changes to an account of the first user 101 with a business, verbal or text passwords required to access the account of the first user 101, other information, or a combination thereof. In certain embodiments, the user profiles may include user accounts for the users of the system 100. The user profiles may be stored directly on the first user device 102, the second user device 111, the database 155, the database 156, the database 157, on any other device in the system 100, or on any combination thereof. Additionally, the user profiles may be accessible by any device in the system 100, any network in the system 100, or a combination thereof.

The system 100 may also include a customer care center 107, which may be a customer care center 107 of a business that the first user 101 is attempting to contact, is attempting to buy products and/or services from, has already bought products and/or services from, is attempting to seeking assistance from, is able to obtain information relating to the business from, is able to troubleshoot issues relating to products and/or services with, is able to obtain training from, is able to obtain any type of information provided by any type of customer care center 107, or any combination thereof. In certain embodiments, the customer care center 107 may reside within the communications network 135, and, in certain embodiments, the customer care center 107 may reside outside of the communications network 107, but may still utilize the services of the communications network 135 to facilitate the functions and operations of the customer care center 107. Operations and functionality of the customer care center 107 may also be supported by utilizing the servers 140, 145. The customer care center 107 may utilize the communications network 135 and/or the IVR system 150 to receive, process, and handle calls from users that are seeking assistance from the customer care center 107. Additionally, the customer care center 107 may include a pool of agents 108 from which one or more agents (e.g. customer service agents) may be selected to assist a caller that calls into the customer care center 107, such as after the caller is initially connected to the IVR system 150. For example, the pool of agents 108 may include the second user 110 (e.g. first customer agent), a second agent 115, and a third agent 120. Notably, the pool of agents 108 may include any number of agents.

The customer care center 107 may include, or otherwise have access to, the IVR system 150. The IVR system 150 may enable the first user 101 to interact with the customer care center 107 when the first user 101 calls a phone number of the customer care center 107 and/or business controlling the customer care center 107 using the first user device 102. In certain embodiments, the IVR system 150 may be accessed via an application executing on the first user device 102 that communicates with the components of the customer care center 107. In certain embodiments, the IVR system 150 may have a digital interface that may be accessible via a touchscreen of the first user device 102. Once the first user 101 calls the phone number, the first user 101 may be connected to the IVR system 150 and may interact with the IVR system 150 via a physical keypad on the first user device 102, a digital keypad displayed on an interface of the first user device 102, speech and speech commands input via a microphone of the first user device 102, other types of inputs input via an application of the first user device 102, or any combination thereof. The IVR system 150 may be configured to respond to inputs (e.g. speech, keypad inputs, etc.) with recorded and/or dynamically generated audio to further direct the first user 101 on how to proceed with obtaining assistance. In certain embodiments, the IVR system 150 may utilize the servers 140, 145 to facilitate the operations and functions of the IVR system 150, and may include any hardware and/or software necessary to support its functions. In certain embodiments, the IVR system 150 may include any functionality of a traditional interactive voice response system.

The IVR system 150 may be configured to extract and analyze information from speech made by a user, such as first user 101, while the user is connected and communicating on a call with the IVR system 150. In certain embodiments, the servers 140, 145 may perform the extraction and/or analysis, and, in certain embodiments, any appropriate device in the system 100 may perform the analysis. In certain embodiments, the real time call attribute assessment system 152 may be configured to perform the extraction and/or analysis on the speech. The real time call attribute assessment system 152 may be software, hardware, or a combination of software and hardware and may reside in the communications network 135 and/or the customer care center 107. The IVR system 150 and/or the real time call attribute assessment system 152 may obtain attributes and information from the speech by extracting and determining words spoken by the first user 101 during the call, determining volume inflection information from the speech spoken by the first user 101, determining speech patterns in the speech, determining grammar utilized by the first user 101, conducting voice frequency analysis on the first user's 101 speech, calculating response speed information that may indicate a rate at which the first user responds to prompts provided by the IVR system 150, calculating a rate at which the first user 101 is speaking, performing any other type of voice analysis, copying portions of the speech itself, or any combination thereof.

Once the attributes and information are obtained from the speech made by the first user 101 on the call with the IVR system 150 of the customer care center 107, the IVR system 150 and/or the real time call attribute assessment system 152 may further analyze the attributes and information to determine further attributes and information associated with the first user 101. For example, the extracted words spoken during the call may be utilized to determine an education level of the first user 101, languages spoken by the first user 101, a stress level of the first user 101, an accent of the first user 101, an ethnicity of the first user 101, a race of the first user 101, a gender of the first user 101, a geographic region/location of the first user 101, an age of the first user 101, any other demographic information associated with the first user 101, or any combination thereof. As another example, the volume inflection information may be analyzed to determine if the first user 101 an anger level, a calmness level, a stress level, whether the first user 101 is a male or female, whether the first user 101 is nervous, whether the first user 101 is stern, any emotional state of the first user 101, or any combination thereof.

As another example, the voice frequency analysis information may be utilized to determine the gender of the first user 101 (e.g. a low frequency or a frequency below a threshold may indicate a male and a high frequency may indicate a female), the age of the first user 101, emotional states of the first user 101, demographic information of the first user 101, or any combination thereof. As yet another example, the response speed information may be utilized to determine whether the first user 101 is stressed, whether the call is urgent (e.g. fast response times may indicate that the first user 101 is trying to resolve a problem as fast as possible and the problem is important; slow response times may indicate that the call is not urgent and has less importance), emotional states of the first user 101, any demographic information of the first user 101, or any combination thereof. As yet a further example, the grammar utilized by the first user 101 during the call may be utilized determine the first user's 101 education level, state of mind, emotional state, age, gender, location, or any combination thereof. Notably, any of the information obtained from the speech of the first user 101 may be utilized to determine any emotional information for the first user 101, any demographic information for the first user 101, or any combination thereof. Any of the attributes and information obtained may be stored in the databases 155, 156, 157 for future use.

The system 100 may also include a communications network 135. The communications network 135 of the system 100 may be configured to link each of the devices in the system 100 to one another, and may be configured to support the functionality and services provided by the customer care center 107 of the business. For example, the communications network 135 may be utilized by the first user device 102 to connect with other devices within or outside communications network 135, such as second user device 111 of the second user 110, who may be a customer service agent. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by the first and second users 101, 110. The communications network 135 may also include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a multiprotocol label switching (MPLS) network, a content distribution network, an internet protocol television network, any network, or any combination thereof. Illustratively, servers 140, 145 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to deliver data, media content, and service using an internet protocol suite and by utilizing packet switching. The communications network 135 may provide the ability to stream data and content requested by the first and second users 101, 110, provide any data generated by any other device of the system 100, or any combination thereof. In certain embodiments, the communications network 135 may include any of the components and functionality found in traditional communication networks. In certain embodiments, the communications network 135 may include hardware components that include any of the functional features of a radio access network. The communications network 135 may be configured to provide interactive voice response services, cellular services, any type of services, or any combination thereof. Additionally, the communications network 135 may include any of the functionality of a base station utilized in mobile communication networks. For example, the communications network 135 may include any number of antennae, transceivers, digital signal processors, control electronics, GPS receivers, electrical power sources, radio equipment, and electronics equipment to create a cell for the communications network 135. The communications network 135 may be configured to communicate with and receive content and data streams from any other network or system, or any combination thereof.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a data and content source for stored data and content that may be accessed by the communication network 135 so that the communication network 135 may obtain the data and content for the first and second users 101, 110 in an efficient and effective manner. In certain embodiments, the database 155 may serve as a central repository for data and content and information requested by the first and second users 101, 110. Furthermore, the database 155 may include a processor and memory or be connected to a processor and memory to perform the various operation associated with the database 155.

In certain embodiments, the database 155 may be connected to servers 140, 145, 160, first user device 102, second user device 111, the IVR system 150, the real time call attribute assessment system 152, the database 156, the database 157, any other device or system, or any combination thereof. The database 155 may also store information and metadata obtained from the system 100, store media content, store metadata and other information associated with the first and second users 101, 110, store user profiles associated with the first and second users 101, 110, user accounts of the first user 101, store device profiles associated with the first user device 102, the second user device 111, and/or any other device in the system 100, store location information, store communications traversing the system 100, store user preferences, such as preferences relating to the use of the IVR system 150 and types of products and services that the user likes, store information associated with any device or signal in the system 100, store information relating to patterns of usage relating to the first and second user devices 102, 111, store call records, store content, store service subscription information associated with services subscribed to by the first user 101, store information utilized for identifying communications network 135, store any of the attributes and information obtained from the speech of the first user 101 and/or second user 110, store any analyses performed on the attributes and information, store speech recordings, store regression algorithms, store information associated with each agent in the pool of agents 108, store call-back rates for each agent in the pool of agents 108, store any type of demographic information associated with the first and second users 101, 110, store a history of calls made by the first user 101 to the customer care center 107 including call backs, store cause codes indicating that reasons why the first user 101 called the customer care center 107, store any information traversing the system 100, or any combination thereof. Furthermore, the database 155 may be configured to process queries sent to it by any device in the system 100.

In addition to database 155, the system 100 may also include databases 156 and 157. Database 156 may be primarily configured to store demographic information associated with any of the users of the system 100, user accounts of the users of the system 100, any information stored by database 155, or a combination thereof. For example, the database 156 may store age information, voice accent information, race information, ethnicity information, location information, gender information, education level information, personality information, emotional information, any type of demographic or psychographic information, any type of information, or any combination thereof. The database 156 may be communicatively linked with any device and/or system in system 100, and may be configured to process queries sent to it by any device in the system 100. Database 157 may be primarily configured to store any type of available regression algorithm and historical database information including results outputted from regression analyses performed on the demographic information, attributes, and information associated with the users of the system 100. In certain embodiments, the database 157 may store regression results for each customer service agent in the pool of agents 108 for each tracked customer attribute being monitored by the system 100. The regression results may indicate which agent is optimal for a particular type of demographic, customer attribute, psychographic, or any combination thereof. In certain embodiments, the database 157 may store information identifying which agents were connected with which users calling into the customer care center 107, along with the agents' success rates in assisting the users with issues brought up on calls with the agents. In certain embodiments, the database 157 may store call-back rates and scores for each agent in the pool of agents 108 and any of the information stored in databases 155, 156. The database 157 may be communicatively linked with any device and/or system in system 100, and may be configured to process queries sent to it by any device in the system 100.

Operatively and referring to FIGS. 1-2, the system 100 may direct calls using historical call backs, demographics, and real time attributes as shown in the following exemplary scenario. In the example scenario, the first user 101 may be a 35 year old Hispanic male that may wish to seek assistance with a phone service he subscribes to and an account associated with the phone service. At step 202, the first user 101 may call, by using first user device 102, a telephone number of the customer care center 107 of the phone company that provides his phone services to seek assistance with the phone service subscribed to. The first user 101 may be connected to the IVR system 150 of the customer care center 107, which may begin asking a series of questions and providing a series of prompts for the first user 101 to respond to which relate to the assistance being sought by the first user 101. As the first user 101 talks on the call with the IVR system 150, the system 100 may, at step 204, analyze and/or record the first user's 101 speech so as to determine attributes (e.g. demographic attributes) and information associated with the first user 101, such as by utilizing the real time call attribute assessment system 152. The system 100, at step 206, may utilize the determine attributes as inputs so as to assist in determining an optimal agent to assist the first user 101. Also, at step 206, the system 100 may determine if the first user 101 is the owner of the account by comparing the first user's 101 determined attributes to the attributes stored in a user profile of the owner of the account. For example, if the attributes of the first user 101 indicate that the first user 101 has a Spanish accent and is male, and the user profile of the owner of the account is a Hispanic male, the system 100 may determine that the first user 101 is the owner of the account. If, however, the first user 101 had an Irish accent based on the attributes obtained from the call with the IVR system 150, the system 100 may determine that the first user 101 is not the owner of the account.

At step 208, the system 100 may determine which agents of the pool of agents 108 are available to connect with the first user 101 on the call. For example, agents 110, 115, and 120 may be available in this example. Each of the agents may have their own profiles (e.g. call-back profiles) that indicate their call-back rates for various sets of attributes (e.g. demographic attributes) and/or scores indicative of their ability to handle users having such attributes. A call-back rate may indicate how often a particular user having a particular set of attributes calls-back into the customer care center 107 to resolve a particular issue. Assuming the first user 101 is the account owner, the system not only has static demographic information, but also dynamic information about the first user 101. For example, during the call with the IVR system 150, the system 100 may determine whether the first user's 101 volume is going up (indicating anger or stress) and/or is using words that indicate that the first user 101 is upset. At step 210, the system 100 may select a specific agent or care representative to assist the first user. The selection of the optimal agent may be based on the attributes obtained from the call between the first user 101 and the IVR system 150, based on the attributes and demographic information in the user profile of the account owner (the first user 101 in this case), and based on performing regression analyses 218 using such information. The selection of the optimal agent may also be based on analyzing the call-back profiles of the agents to determine which agent has the best call-back rate for the attributes of the first user 101. For example, in this case, the system 100 may select agent/care representative 110, who may be able to speak Spanish, may be in the same age range as the first user 101, and may have a very low call-back rate for users having the types of attributes as the first user 101. In certain embodiments, the agent may be selected based on the agent having the highest score in dealing with users having the types of attributes that first user 101 has. If the first user 101 is the account owner, the system 100 may create a call record including the attributes and historical demographic information, and attach the name of the selected agent and store the record in any of the databases 155, 156, 157.

At step 212, the selected agent may be connected to the call with the first user 101 so as to assist the first user 101 with the issues relating to the phone service subscribed to by the first user 101. At step 214, the system 100 may analyze the real-time speech made by the first user 101 during the call with the selected agent to obtain further information and attributes of the first user 101. The real-time information 216 obtained may include a wide variety of details about the customer and the interaction flow with the selected agent on the call with the first user 101. The real-time information 216 may be stored in database 155 and utilized in conducting the regression analyses 218 performed by the system 100 in selecting agents. Once the regression analyses 218 are performed, the regression results for each agent for each tracked attribute of the first user 101 may be stored in database 156 and may be utilized to select agents in the future. The system 100 may monitor, over time, how many times the first user 101 calls back into the customer care center 107 to address an issue or fix something of concern and on subsequent calls may select a different agent to speak to the first user 101 if the different agent is more optimal than the initial agent at the time of the subsequent calls. For example, on a subsequent call, if the analyzed speech indicates that the first user 101 is extremely mad, a different agent (e.g. agent 115) may have a call-back profile that indicates that the different agent has a better call-back rate for users having attributes indicative of anger. Over time, the call record, the call-back profiles of the agents, and the information stored in the databases 155, 156, 157 may be updated and supplemented after each call so that the system's 100 performance may continually improve and have better data to conduct the regression analyses 218 for selecting the optimal agent for the first user 101 and other users. In certain embodiments, a certain percentage of calls may be assigned to agents at random so that the information stored in the databases 155, 156, 157 and the system 100 itself is not too biased in its processes. Notably, the system 100 may incorporate any of the functionality and features described for the method 300 or as otherwise described herein.

Notably, as shown in FIG. 1, the system 100 may perform any of the operative functions disclosed herein by utilizing the processing capabilities of server 160, the storage capacity of the databases 155, 156, 157 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving, at the IVR system 150, calls from users seeking assistance; determining, based on speech of the users, sets of attributes associated with the users; comparing the sets of attributes associated with the users to user profiles of owners of accounts associated with the calls; determining if the users are the owners of the accounts associated with the calls; generating call records including the sets of attributes and historical demographic information; selecting, based on the attributes and historical demographic information, agents having scores that indicate a higher probability of successful interactions with the users than other available agents; connecting the selected agents to the calls; determining further attributes of the users based on the user's speech that occurs after connecting the agents to the calls; supplementing the call records with the further attributes of the users; and performing any other suitable operations conducted in the system 100 or otherwise. In one embodiment, multiple servers 160 may be utilized to process the functions of the system 100. The server 160 and other devices in the system 100 may utilize the databases 155, 156, 157 for storing data about the devices in the system 100 or any other information that is associated with the system 100. In one embodiment, multiple databases 155, 156, 157 may be utilized to store data in the system 100.

Although FIGS. 1-2 illustrate specific example configurations of the various components of the system 100, the system 100 may include any configuration of the components, which may include using a greater or lesser number of the components. For example, the system 100 is illustratively shown as including a customer care center 107, first user device 102, a second user device 111, a communications network 135, a server 140, a server 145, an IVR system 150, a real time call attribute assessment system 152, a database 155, a database 156, a database 157, and a server 160. However, the system 100 may include multiple customer care centers 101, multiple first user devices 102, multiple second user devices 111, multiple communications networks 135, multiple servers 140, multiple servers 145, multiple IVR systems 150, multiple real time call attribute assessment systems 152, multiple databases 155, multiple databases 156, multiple databases 157, and multiple servers 160, or any number of any of the other components in the system 100. In certain embodiments, the apparatus 200 may include the customer care center 107, the pool of agents 108, the IVR system 150, the real time call attribute assessment system 152, the database 155, the database 156, the database 157, the server 140, the server 145, the communications network 135, any other device, or any combination thereof. Furthermore, in certain embodiments, substantial portions of the functionality and operations of the system 100 may be performed by other networks and systems that may be connected to system 100.

Figure 3:
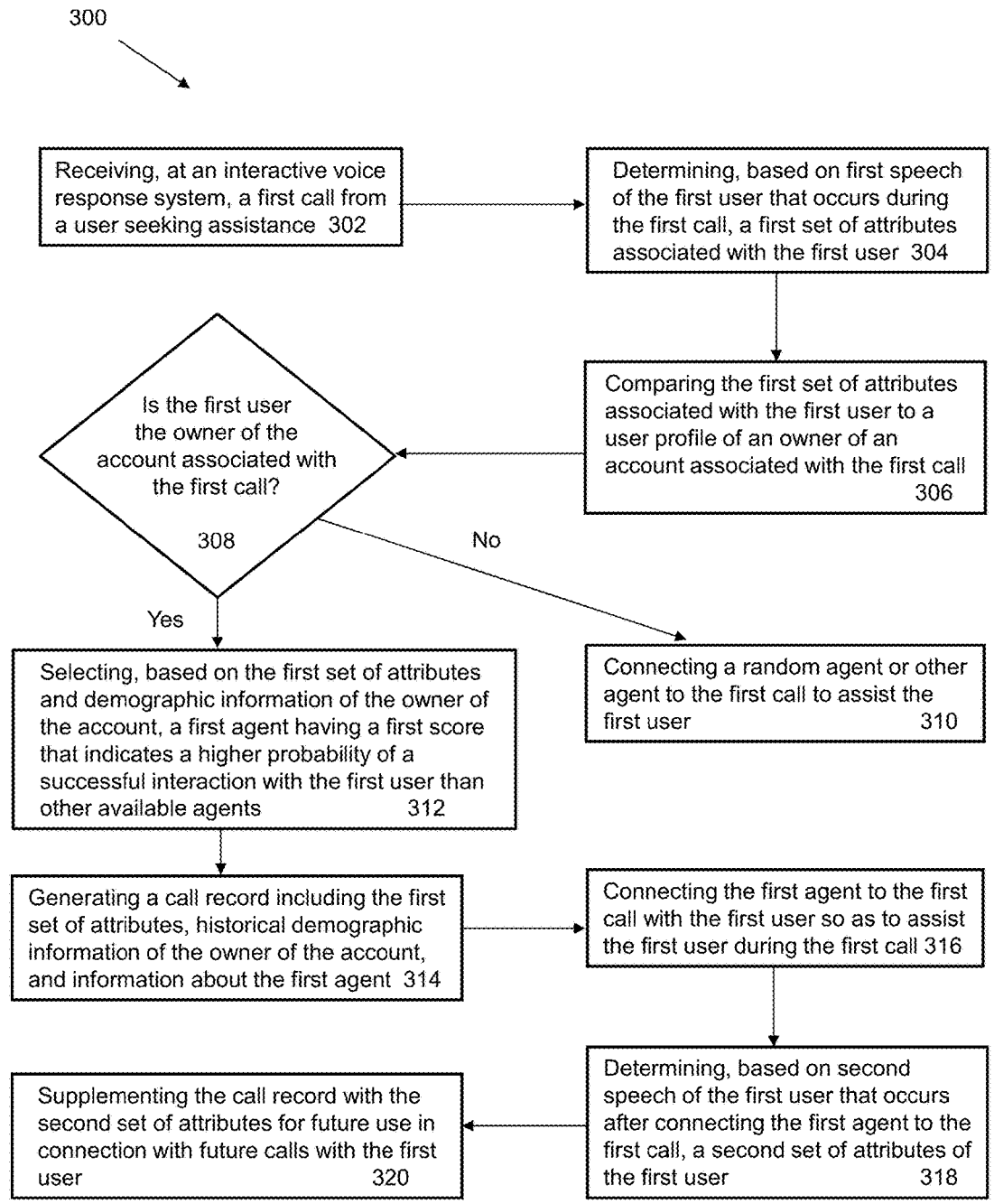
FIG. 3 is a flow diagram illustrating a sample method for directing calls using historical call backs, demographics, and real time attributes according to an embodiment of the present disclosure.

As shown in FIG. 3, an exemplary method 300 for directing calls using historical call backs, demographics, and real time attributes is schematically illustrated, and may include, at step 302, receiving, at an IVR system 150 of a customer care center 107, a first call from a user seeking assistance with an issue. For example, the first call may be received from the first user 101 using the first user device 102, and the first user 101 may be seeking assistance with selecting a type of internet service plan use in the first user's 101 home. In certain embodiments, the call may initiated and/or received by utilizing the first user device 102, the server 140, the server 145, the server 160, the communications network 135, the IVR system 150, the real time call attribute assessment system 152, any combination thereof, or by utilizing any other appropriate program, network, system, or device. Once the call is received, the first user device 102 may be connected to the IVR system 150 and the IVR system 150 may proceed to ask the first user 101 various questions and provide various responses in response to answers received from the first user 101. The first user's 101 speech and responses may be analyzed and recorded by the IVR system 150 and/or the real time call attribute assessment system 152.

As the first user 101 is speaking during the call with the IVR system 150 and the speech is recorded and/or analyzed, the method 300 may include, at step 304, determining a first set of attributes of the first user 101 based on the analyzed speech of the first user 101. In certain embodiments, the attributes may be determined by extracting and analyzing words being used by the first user 101 during the call, performing voice frequency analysis on the speech of the first user 101, extracting volume inflection information, determining user response speed information, determining voice tone information, determining voice pitch information, applying speech analysis algorithms on the speech, or any combination thereof. In certain embodiments, the determining may be performed by utilizing the first user device 102, the server 140, the server 145, the server 160, the communications network 135, the IVR system 150, the real time call attribute assessment system 152, any combination thereof, or by utilizing any other appropriate program, network, system, or device. The attributes, for example, may indicate the first user's 101 gender, the first user's 101 age, the first user's 101 education level, the first user's 101 accent, the first user's 101 emotional state, the first user's 101 race, any demographic information associated with the first user 101, any psychographic information associated with the first user 101, or any combination thereof.

Once the first set of attributes of the first user 101 are determined from the speech of the first user 101, the method 300 may include, at step 306, comparing the first set of attributes of the first user 101 to a user profile of an owner of an account associated with the call. For example, if the first user 101 is calling regarding adding an internet service plan to an existing account that already has subscribed to internet protocol television services, the system 100 may compare the attributes of the first user 101 with information stored in the user profile of the owner of the existing account already subscribed to the internet protocol television services. The user profile may include any demographic information of the owner of the account, voice recordings of the owner of the account, voice frequency analysis information of the owner of the account, volume inflection information of the owner of the account, speech pattern information of the owner of the account, typical user response speed information for the owner of the account, typical words utilized by the owner of the account, psychographic information of the owner of the account, any other information associated with the owner of the account, or any combination thereof. In certain embodiments, the comparing may be performed by utilizing the server 140, the server 145, the server 160, the communications network 135, the IVR system 150, the real time call attribute assessment system 152, any combination thereof, or by utilizing any other appropriate program, network, system, or device.

At step 308, the method 300 may include determining if the first user 101 is the owner of the account based on comparing the first set of attributes of the first user 101 with the user profile of the owner of the account. In certain embodiments, the determining may be performed by utilizing the server 140, the server 145, the server 160, the communications network 135, the IVR system 150, the real time call attribute assessment system 152, any combination thereof, or by utilizing any other appropriate program, network, system, or device. If the first user 101 is determined not to be the owner of the account, the method 300 may include, at step 310, connecting the first user 101 with a random agent from the pool of agents 108 to further assist the first user 101. In certain embodiments, at step 310, the method 300 may connect the first user 101 with an agent having a profile that indicates that the agent has a historically higher chance of successfully interacting with users having the type of attributes in the first set of attributes. In certain embodiments, the selection of the agent may be performed by utilizing the server 140, the server 145, the server 160, the communications network 135, the IVR system 150, the real time call attribute assessment system 152, any combination thereof, or by utilizing any other appropriate program, network, system, or device.

If, however, at step 308, the first user 101 is determined to be the owner of the account based on the comparison, the method 300 may include, at step 312, selecting, based on the first set of attributes and historical demographic information of the owner of the account, a first agent from the pool of agents 108 having a score or rating that indicates a higher probability of a successful interaction with the first user 101 than other available agents in the pool of agents 108. The score or rating may be indicated in a profile of the agent, along with an identification of attributes (e.g. demographic attributes/user attributes) that the agent has success in dealing with historically. In certain embodiments, an agent may be selected if the score or rating is greater than a threshold value set by the business controlling the customer care center 107. For example, if the information indicates that the first user 101 has a Spanish accent, has an engineering background, and is speaking with a low stress level, the system 100 may select an agent that is fluent in Spanish, has a technological background, is suited for dealing with users having low stress levels, and has a high enough score dealing with such users. The selecting of the agent may also be based on call duration details and/or the time of day the call has come into the customer care center 107. In certain embodiments, the selecting may be performed by utilizing the server 140, the server 145, the server 160, the communications network 135, the IVR system 150, the real time call attribute assessment system 152, any combination thereof, or by utilizing any other appropriate program, network, system, or device. At step 314, the method 300 may include generating a call record including the first set of attributes of the first user 101 and historical demographic information of the owner of the account and attaching an identifier of the first agent to the call record. In certain embodiments, the call record may be created by utilizing the server 140, the server 145, the server 160, the communications network 135, the IVR system 150, the real time call attribute assessment system 152, the databases 155, 156, 157, any combination thereof, or by utilizing any other appropriate program, network, system, or device.

Once the first agent (i.e. the agent having the score indicating a higher probability of a successful interaction with the first user 101 than other available agents) is selected, the method 300 may include, at step 316, connecting the first agent to the call with the first user 101 to assist the first user 101 with any questions and/or issues. In certain embodiments, the connecting may be performed by utilizing the first user device 102, the server 140, the server 145, the server 160, the communications network 135, the IVR system 150, the real time call attribute assessment system 152, any combination thereof, or by utilizing any other appropriate program, network, system, or device. Once the first agent is connected to the call, the method 300 may include, at step 318, analyzing the speech of the first user 101 while the first user 101 is speaking with the first agent so as to determine a second set of attributes of the first user 101. In certain embodiments, the analyzing and the determining may be performed by utilizing the first user device 102, the server 140, the server 145, the server 160, the communications network 135, the IVR system 150, the real time call attribute assessment system 152, any combination thereof, or by utilizing any other appropriate program, network, system, or device. At step 320, the method 300 may include supplementing the call record with information relating to the second set of attributes. For example, the call record including the second set of attributes may be utilized for future use in connection with connecting agents, such as the first agent or even other agents, with the first user 101 on subsequent calls. In certain embodiments, the call record may be allocated to the first agent that handled the call.

Over time, the method 300 may include monitoring if the first user 101 calls back into the customer care center 107 on a subsequent occasion and why, through the use of cause codes. A cause code may be a code entered during or after a call with the first user 101 that is utilized to identify a particular reason for the call. In certain embodiments, the method 300 may include performing regression analyses to determine which demographic attributes of the first user 101 work best with a particular agent from the pool of agents 108. For example, for a particular set of demographic attributes, the average number of call backs to the customer care center 107 is 0.151. However, a particular agent of the pool of agents 108 may demonstrate that they handle users with this particular set of demographic attributes with a call back rate of only 0.108. Based on this information, when the first user 101 calls into the IVR system 150, the system 100 may utilize the first user's 101 real-time (e.g. information collected as the user is speaking with the IVR system 150) and historical database information to dynamically select the best agent from the pool of agents 108 to assist the first user 101. Notably, the method 300 may further incorporate any of the functionality and features as described for system 100, the apparatus 200, or as otherwise described herein.

Notably, the system 100, the apparatus 200, and methods disclosed herein may include additional functionality and features. For example, in certain embodiments, the system 100, the apparatus 200, and methods may include selecting an agent, for a user, that has the highest historical success at resolving calls made by users having similar attributes on the first call. In certain embodiments, this may imply a slight time delay in the agent selection process to ensure that enough agents in the pool of agents 108 are available to have a meaningful selection for the caller. As an example, if an agent is to be assigned, and the next agent to free up with availability is assigned to the user calling in, then the total number of possible candidates to select from is one. If, however, the system 100 waits for a predetermined period of time, the system 100 may have many more potential candidates to select from. The system 100 may then select an optimal agent from the available pool of agents 108.

Since the system 100 directs callers to agents, this may imply that there is a lack of randomness during the selection process. In order to continue to collect unbiased information for the regression analyses conducted by the system 100, the system 100 may ensure that a certain percentage of calls directed to a particular agent are truly random. In doing so, the system 100 may monitor which calls sent to an agent are random versus which calls sent to an agent are directed. Building up the information that may be stored in the databases 155, 156, 157 for regression analyses of the effectiveness agents versus demographics of callers may take some time. Once this is completed, call direction may be performed, and thereafter, it is likely that a certain percentage (e.g. 10%) of calls to a particular agent would need to be truly random for ongoing regression updates.

Notably, the functionality provided by the system 100, the apparatus 200, and methods may serve to provide vast improvements to call handling times associated with calls received at the customer care center 107. If the business running the customer care center 107 has 30,000 agents and each agent services an average of 40 calls per day at a minimum cost of $10, then the financial burden for providing this type of customer service support may be on the order of three billion dollars per year. However, by utilizing the system 100, the apparatus 200, and methods, the business may have much improved call times, much fewer call backs to the customer care center 107 (i.e. lower call-back rate), and happier users. As a result, the system 100, the apparatus 200, and methods may reduce the three billion dollar cost incurred by the business significantly.

Figure 4:
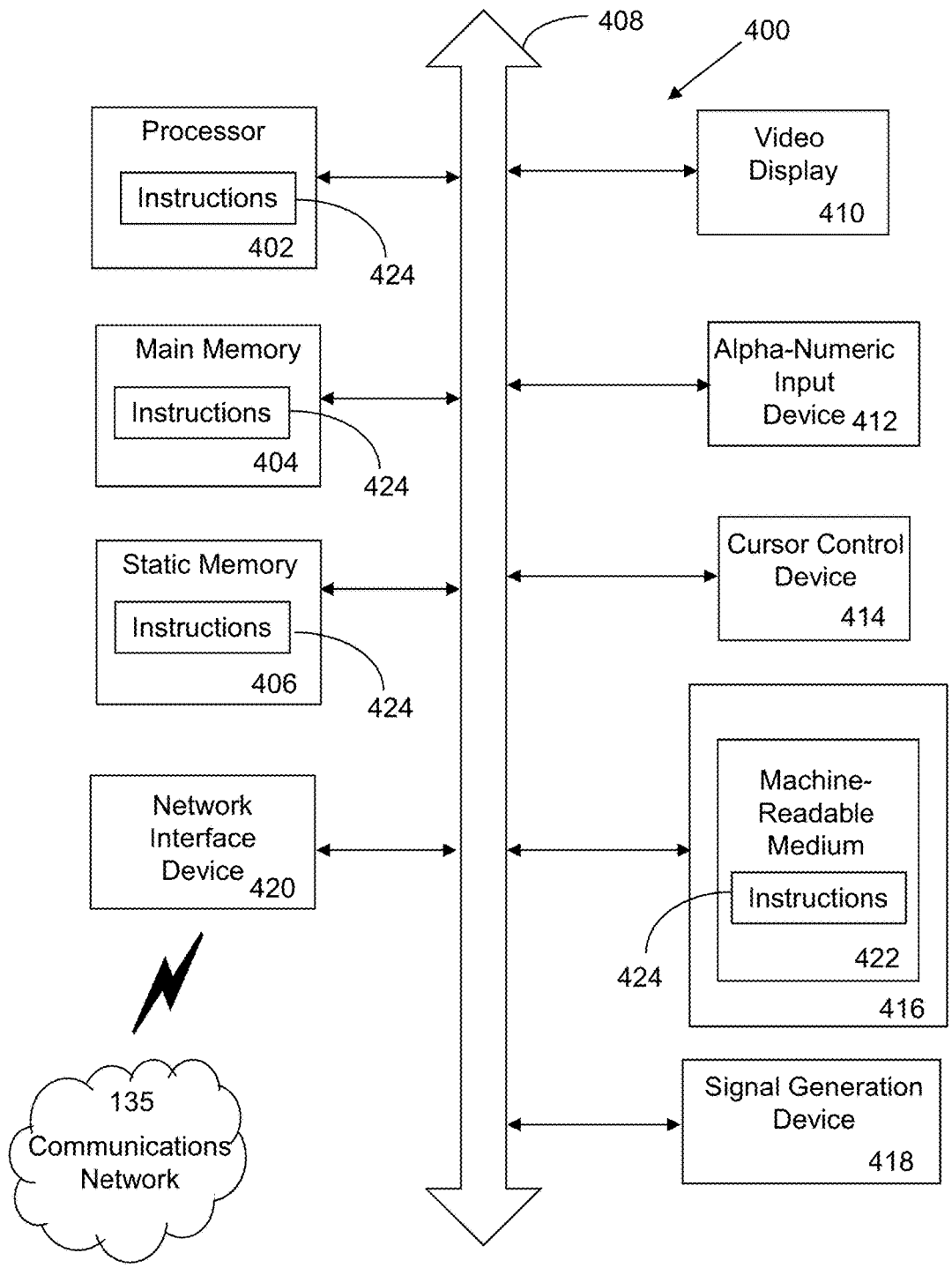
FIG. 4 is a schematic diagram of a machine in the form of a computer system within which a set of instructions, when executed, may cause the machine to perform any one or more of the methodologies or operations of the systems, apparatuses, and methods for directing calls using historical call backs, demographics, and real time attributes.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the customer care center 107, the first user device 102, the second user device 111, the server 140, the server 145, the IVR system 150, the real time call attribute assessment system 152, the database 155, the database 156, the database 157, the server 160, the apparatus 200, any other device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, another network, or a combination thereof, can send or receive voice, video or data, and to communicate over the communications network 135, another network, or a combination thereof, using the instructions. The instructions 424 may further be transmitted or received over the communications network 135, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
   receiving, at an interactive voice response system, a first call from a first user seeking assistance;
   determining, based on first speech of the first user that occurs during the first call and by utilizing the interactive voice response system, a first set of attributes associated with the first user, wherein the first set of attributes are obtained from the first speech based on a speech pattern detected by the interactive voice response system in the first speech and based on grammar detected in the first speech by the interactive voice response system;
   determining, based on comparing the first set of attributes associated with the first user to a user profile of an owner of an account associated with the first call, if the first user is the owner of the account;
   selecting, if the first user is the owner of the account and based on the first set of attributes and historical demographic information of the owner of the account, a first agent having a first score that indicates a higher probability of a successful interaction with the first user than other available agents, wherein the selecting of the first agent further comprises selecting the first agent based on the first agent having a call-back profile including a lower call-back rate for users having the first set of attributes than call-back rates included in call-back profiles of the other available agents;
   generating a call record including the first set of attributes associated with the first user and historical demographic information of the owner of the account and associating the call record with the first agent; and
   connecting the first agent to the first call with the first user to reduce a call handling time for the first call and to reduce a probability of a call back.

2. The system of claim 1, wherein the operations further comprise determining, based on second speech of the first user that occurs after connecting the first agent to the first call, a second set of attributes associated with the first user.

3. The system of claim 2, wherein the operations further comprise including the second set of attributes associated with the first user in the call record.

4. The system of claim 1, wherein the operations further comprise performing, based on historical call-back information, the historical demographic information, and the first set of attributes, a regression analysis to determine which agents from a pool of agents are suited for interacting with users having attributes associated with the first set of attributes.

5. The system of claim 1, wherein the operations further comprise conducting a voice frequency analysis on the first speech of the first user to determine the first set of attributes associated with the first user.

6. The system of claim 1, wherein the operations further comprise utilizing volume inflection information associated with the first speech of the first user to determine the first set of attributes associated with the first user.

7. The system of claim 1, wherein the operations further comprise utilizing user response speed information associated with the first speech of the first user to determine the first set of attributes associated with the first user, wherein the user response speed information indicates a rate at which the first user responds to prompts provided by the interactive voice response system.

8. The system of claim 1, wherein the operations further comprise receiving a second call from a second user.

9. The system of claim 8, wherein the operations further comprise selecting, at random, a second agent to connect to the second call with the second user.

10. The system of claim 1, wherein the operations further comprise determining if the first user has made a second call associated with the assistance sought by the first user in the first call.

11. The system of claim 10, wherein the operations further comprise determining, based on second speech of the first user that occurs during the second call, a second set of attributes associated with the first user, and wherein the operations further comprise including the second set of attributes in the call record.

12. The system of claim 11, wherein the operations further comprise selecting, based on the call record including the second set of attributes, a second agent having a second score suited to interact with the first user.

13. The system of claim 1, wherein the operations further comprise not generating, if the first user is determined to not be the owner of the account, the call record.

14. A computer-implemented method executing within a processor that executes instructions from a memory, comprising:

receiving, at an interactive voice response system executed by the processor, a first call from a first user seeking assistance;

determining, based on first speech of the first user that occurs during the first call and by utilizing the interactive voice response system, a first set of attributes associated with the first user, wherein the first set of attributes are obtained from the first speech based on a speech pattern detected by the interactive voice response system in the first speech and based on grammar detected in the first speech by the interactive voice response system wherein the determining is performed by utilizing instructions from the memory that are executed by the processor;

determining, based on comparing the first set of attributes associated with the first user to a user profile of an owner of an account associated with the first call, if the first user is the owner of the account;

selecting, if the first user is the owner of the account and based on the first set of attributes and historical demographic information of the owner of the account, a first agent having a first score that indicates a higher probability of a successful interaction with the first user than other available agents, wherein the selecting of the first agent further comprises selecting the first agent based on the first agent having a call-back profile including a lower call-back rate for users having the first set of attributes than call-back rates included in call-back profiles of the other available agents;

creating a call record including the first set of attributes associated with the first user and historical demographic information of the owner of the account and associating the call record with the first agent; and connecting the first agent to the first call with the first user to reduce a call handling time for the first call and to reduce a probability of a call back.

15. The method of claim 14, further comprising analyzing words extracted from the first speech of the first user to determine the first set of attributes associated with the first user.

16. The method of claim 14, further comprising selecting the first agent having the first score from a pool of agents.

17. The method of claim 14, further comprising determining if the first user has made a second call associated with the assistance sought by the first user in the first call.

18. The method of claim 17, further comprising determining, based on second speech of the first user that occurs during the second call, a second set of attributes associated with the first user, further comprising including the second set of attributes in the call record, and further comprising selecting, based on the call record including the second set of attributes, a second agent having a second score suited to interact with the first user.

19. The method of claim 14, further comprising receiving a second call from a second user, and further comprising selecting, at random, a second agent to connect to the second call with the second user.

20. A computer-readable device comprising instructions, which, when loaded and executed by a processor, cause the processor to perform operations, the operations comprising:

receiving, at an interactive voice response system, a first call from a first user seeking assistance;

determining, based on first speech of the first user that occurs during the first call and by utilizing the interactive voice response system, a first set of attributes associated with the first user, wherein the first set of attributes are obtained from the first speech based on a speech pattern detected by the interactive voice response system in the first speech and based on grammar detected in the first speech by the interactive voice response system;

determining, based on comparing the first set of attributes associated with the first user to a user profile of an owner of an account associated with the first call, if the first user is the owner of the account;

selecting, if the first user is the owner of the account and based on the first set of attributes and historical demographic information of the owner of the account, a first agent having a first score that indicates a higher probability of a successful interaction with the first user than other available agents, wherein the selecting of the first agent further comprises selecting the first agent based on the first agent having a call-back profile including a lower call-back rate for users having the first set of attributes than call-back rates included in call-back profiles of the other available agents;

generating a call record including the first set of attributes associated with the first user and historical demographic information of the owner of the account and associating the call record with the first agent; and connecting the first agent to the first call with the first user to reduce a call handling time for the first call and to reduce a probability of a call back.

\* \* \* \* \*